United States Patent [19]

Lambregts et al.

[11] 4,354,237

[45] Oct. 12, 1982

[54] METHOD AND APPARATUS FOR PRODUCING AN AIRCRAFT FLARE PATH CONTROL SIGNAL

[75] Inventors: Antonius A. Lambregts, Renton; Rolf Hansen, Bellevue, both of Wash.

[73] Assignee: The Boeing Company, Seattle, Wash.

[21] Appl. No.: 162,451

[22] Filed: Jun. 24, 1980

[51] Int. Cl.³ .......................... G06G 7/78; G05D 1/12
[52] U.S. Cl. ................... 364/428; 73/178 T; 244/183; 244/187; 364/429
[58] Field of Search ....................... 364/428, 429, 430; 340/26; 318/583; 244/183, 186, 187; 73/178 T

[56] References Cited

U.S. PATENT DOCUMENTS

| | | | |
|---|---|---|---|
| 3,169,730 | 2/1965 | Gaylor et al. | 244/187 |
| 3,265,333 | 8/1966 | Montooth | 244/187 |
| 3,295,796 | 1/1967 | Gaylor | 244/187 |
| 3,310,259 | 3/1967 | Swift et al. | 244/187 X |
| 3,333,795 | 8/1967 | Hattendorf et al. | 244/187 |
| 3,437,292 | 8/1969 | Greene | 244/187 |
| 3,463,422 | 8/1969 | Watson | 244/187 X |
| 3,489,378 | 1/1970 | Watson et al. | 244/187 |
| 3,601,339 | 8/1971 | Watson | 244/187 |
| 3,604,908 | 9/1971 | Loome et al. | 364/430 |
| 3,618,002 | 11/1971 | Stinson | 244/183 X |
| 3,626,163 | 12/1971 | Dommasch | 364/429 |
| 3,652,835 | 3/1972 | Devlin et al. | 364/429 |
| 3,752,967 | 8/1973 | Vietor | 364/427 |
| 3,976,267 | 8/1976 | Meyer et al. | 364/430 X |
| 4,006,871 | 2/1977 | Simpson | 364/428 X |
| 4,093,158 | 6/1978 | Clews et al. | 244/182 |
| 4,106,731 | 8/1978 | Bliss | 364/428 X |
| 4,141,522 | 2/1979 | Lambregts | 244/186 |

Primary Examiner—Jerry Smith
Attorney, Agent, or Firm—James P. Hamley; Bernard A. Donahue

[57] ABSTRACT

Aircraft altitude, ground velocity, and altitude rate signals are input to a computer which, using a unique control law, generates a pitch control surface command signal suitable for guiding an aircraft on its flare path to a specified runway touchdown point despite varying wind conditions.

2 Claims, 4 Drawing Figures

METHOD AND APPARATUS FOR PRODUCING AN AIRCRAFT FLARE PATH CONTROL SIGNAL

BACKGROUND OF THE INVENTION

The invention described herein was made in the performance of work under a NASA contract No. NAS1-14880 and is subject to the provisions of Section 305 of the National Aeronautics and Space Act of 1948, Public Law 85-568 (72 Stat. 435; 42 USC 2457).

The present invention pertains to the aircraft guidance art and, more particularly, to a system for controlling aircraft flight during landing flare.

A critical portion of aircraft landing trajectory is commonly known as flare-out or flare. Flare is that portion of the landing trajectory between the fixed angle glideslope and aircraft runway touchdown. Thus, it is desirable, particularly for commercial aircraft, that the flare profile depart smoothly from the fixed angle glideslope approach providing a smooth transition to runway rollout.

In commercial aircraft, attempts have been made at generating landing flare commands to be used either as a flight director to the pilot or for automatic, i.e. autopilot, landing. The problem with these systems, however, is that groundspeed variations affect touchdown dispersion. That is, since aircraft groundspeed is not taken into account, the actual touchdown point of the aircraft on the runway can vary considerably depending on the groundspeed. This is undesirable both for safety reasons and because reduced touchdown dispersion is essential to effective runway utilization and continued aircraft operation under adverse weather conditions.

Another problem with existing flare control systems is that the flare height from which flare is initiated may be affected by aircraft groundspeed. This has an adverse effect on the ability of the pilot to monitor the system for proper operation and may place the start of the flare ahead of the runway threshold where terrain features may make it difficult to use radio altimeters.

SUMMARY OF THE INVENTION

It is an object of the present invention, therefore, to provide apparatus for generating, and a method of producing an aircraft flare path control signal which minimizes touchdown dispersion due to groundspeed variations.

It is a further object of the invention to provide the above described apparatus for, and method of generating an aircraft flare path control signal wherein the altitude at which flare is initiated is independent of groundspeed.

Briefly, according to the invention, apparatus for producing an aircraft flare path control signal includes a means for producing a signal h representative of aircraft altitude. Also, suitable means produces a signal $V_G$ representative of aircraft groundspeed and further means produces a signal $\dot{h}$ representative of aircraft altitude rate. A computer produces a pitch control surface command signal $\delta_{ec}$ according to the relationship:

$$\delta_{ec} = K_{\dot{h}}\{\dot{h} + V_G[(K_h/K_{\dot{h}})/V_{G\,REF}](h + h_B)\}$$

where $K_{\dot{h}}$, $K_h$, $V_{G\,REF}$ and $h_B$ are constants selected for a given system configuration.

A method for producing an aircraft flare path control signal comprises the first step of producing signal h representative of aircraft altitude. Second, a signal $V_G$ is produced representative of aircraft groundspeed. Third, a signal $\dot{h}$ is produced, representative of aircraft altitude rate. Finally, a pitch control surface command signal $\delta_{ec}$ is computed according to the relationship:

$$\delta_{ec} = K_{\dot{h}}\{\dot{h} + V_G[(K_h/K_{\dot{h}})/V_{G\,REF}](h + h_B)\}$$

where $K_{\dot{h}}$, $K_h$, $V_{G\,REF}$ and $h_B$ are constants selected for a given system configuration.

DETAILED DESCRIPTION OF THE PREFERRED EMBODIMENT OF THE INVENTION

In one type of flare control law widely used today, the aircraft sinkrate is proportional to altitude. Thus, excluding damping terms, which are a part of any flare equation, the basic exponential flare control law is of the form:

$$\delta_{ec} = K_{\dot{h}}\dot{h} + K_h(h + h_B) \tag{1}$$

where
$\delta_{ec}$ = pitch control surface command
$\dot{h}$ = altitude rate,
h = altitude,
$K_{\dot{h}}$, $K_h$, $h_B$ = constants selected
for a particular system configuration.

For the condition of a zero pitch control command i.e., the aircraft's servo system reduces the pitch command to zero, the equation takes the following form:

$$K_{\dot{h}}\dot{h} + K_h(h + h_B) = 0. \tag{2}$$

Figure 1:
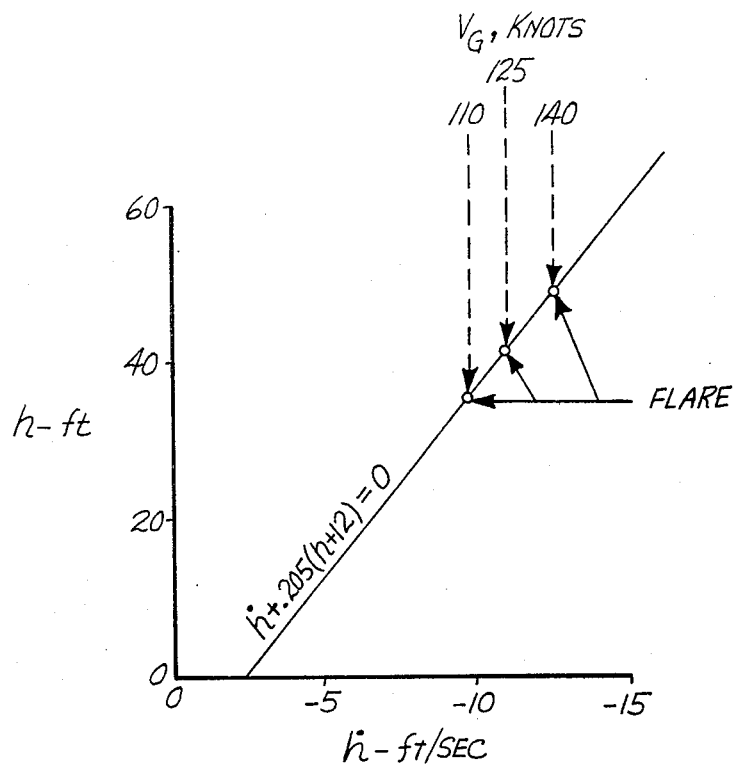
FIG. 1 is a plot of aircraft altitude h versus altitude rate $\dot{h}$ for the prior art flare-out control system.

FIG. 1 is a graph of this equation, showing altitude on the vertical axis versus altitude rate, on the horizontal axis. Exemplary values of the various constants are selected, i.e. the value of $K_h/K_{\dot{h}}$ is assumed to be 0.205 and the value of $h_B$ is assumed to be 12.

Assuming constant control law parameters, the solution for the above differential equation is $$h = -\tau \dot{h}_o e^{-t/\tau} - h_B$$

$$\dot{h} = -\dot{h}_o e^{-t/\tau} \tag{3}$$

where
$\tau = K_{\dot{h}}/K_h$
$\dot{h}_o$ = initial sinkrate = $-V_G \tan \beta$
where,
$V_G$ = groundspeed
$\beta$ = glidepath angle.

The expression for the flare height from which flare must be initiated to satisfy the above equation is $$h_o = V_G \tau \tan \beta - h_B. \tag{5}$$

FIG. 1 illustrates this flare height $h_o$ for values of 110, 125 and 140 groundspeed knots. Thus, since the flare height $h_o$ varies as a function of groundspeed $V_G$ (about six feet for a 15 knot variation in $V_G$) this has an adverse effect on the ability of the pilot to monitor the system for proper operation and may also place the start of the flare ahead of the runway threshold where terrain features may make it difficult to use radio altimeters.

Figure 2:
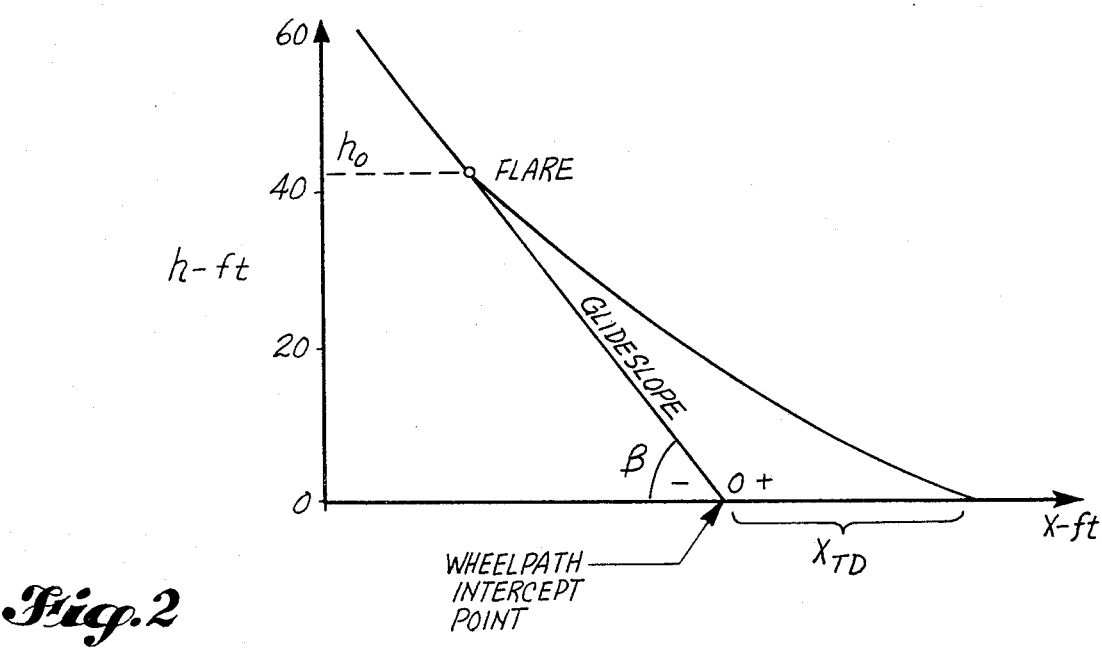
FIG. 2 is a plot of aircraft altitude h versus runway distance X and shows the touchdown dispersion of the prior art system from its glideslope intercept point.

FIG. 2 is a plot of aircraft altitude h versus runway position X and illustrates the distance $X_{TD}$ between the aircraft actual touchdown point and the glideslope intercept point with the runway. It is assumed that the aircraft is on a glideslope angle $\beta$ and that flare is initiated at the altitude $h_o$, which is approximately 42 feet.

The total distance is expressed analytically as $$X_{TD} = (h_B/\tan \beta) - V_G\tau[\ln(h_B/V_G\tau \tan \beta) + 1]. \quad (4)$$

Thus, it is evident, assuming a constant $h_B$, $\tau$ and $\beta$, that, as with flare height altitude $h_o$, the dispersion distance $X_{TD}$ is a function of groundspeed $V_G$. For example, the touchdown distance $X_{TD}$ varies about 200 feet for a fifteen knot variation in $V_G$, a significant deviation considering the dispersion due to all other sources.

In the development of the instant invention, it was recognized that if the product ($V_G\tau$) in the equations for flare height $h_o$ and touchdown $X_{TD}$ is kept a constant, then both $h_o$ and $X_{TD}$ will be invariant for a varying $V_G$. This requires that $$\tau V_G = (K'_h/K_h)V_{G\ REF} \quad (6)$$

or $$(1/\tau) = (V_G/V_{G\ REF})(K_h/K'_h). \quad (7)$$

The basic controlling equation then becomes
$$K'_h[\dot{h} + (1/\tau)(h + h_B)] = 0 \quad (8)$$

and inserting the value for $1/\tau$, this becomes $$K'_h\{\dot{h} + V_G[(K_h/K'_h)/V_{G\ REF}](h + h_B)\} = 0. \quad (9)$$

Figure 3:
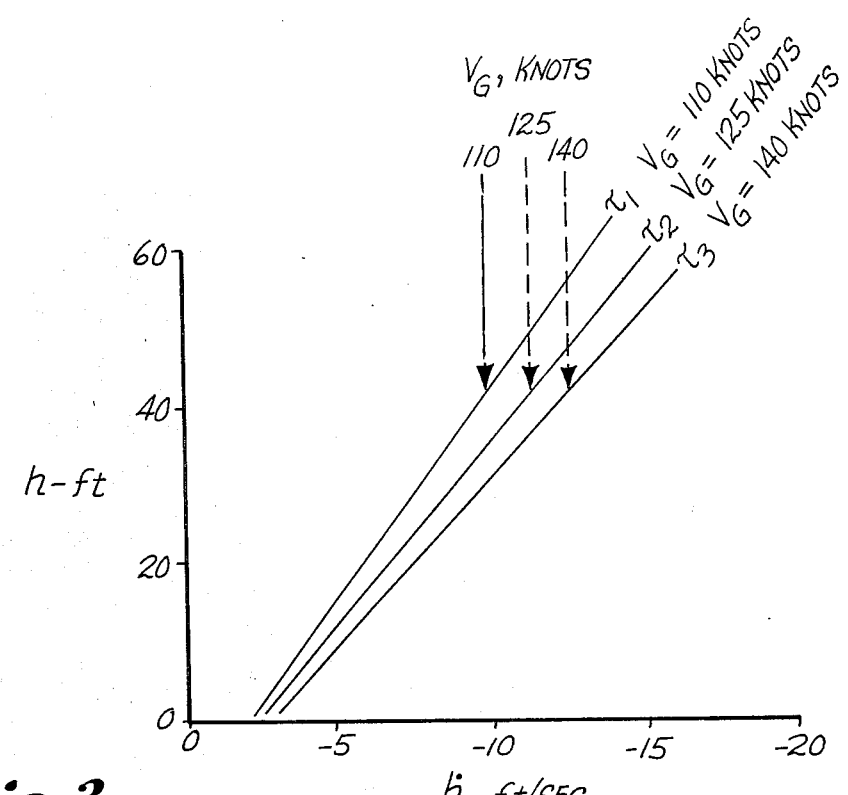
FIG. 3 is a plot of aircraft altitude h versus altitude rate $\dot{h}$ for an aircraft following a control signal according to the instant invention.

This control law is shown graphically in FIG. 3. Plots are made for three different groundspeeds, as before, 110, 125 and 140 knots. It is apparent from this graph that the flare height $h_o$ is no longer dependent on groundspeed $V_G$.

Figure 4:
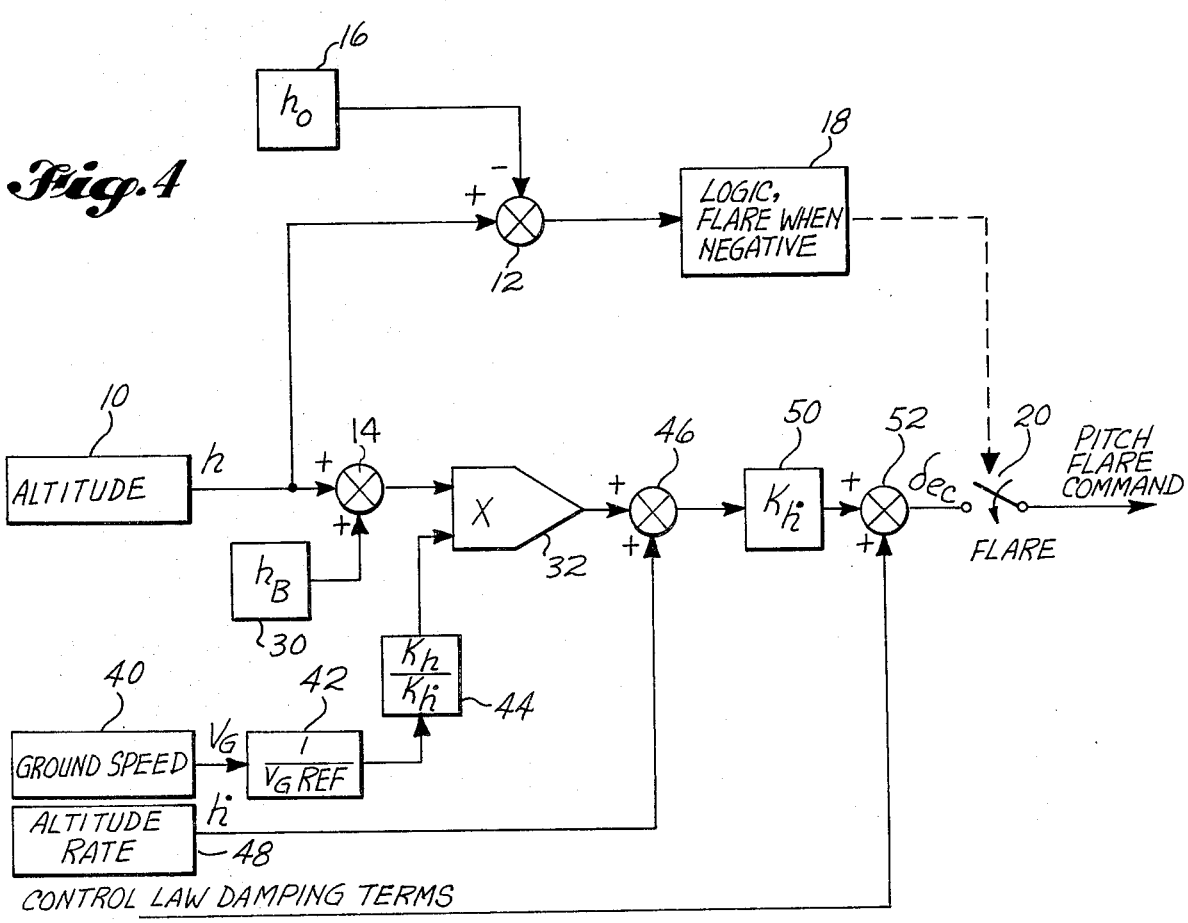
FIG. 4 is a block diagram illustrating the preferred embodiment of a system for generating a control signal according to the instant invention.

FIG. 4 is a block diagram illustrating the preferred embodiment of the apparatus for producing the aircraft flare path control signal in accordance with this newly derived control law.

Here, an altitude block 10 produces an output signal h representative of aircraft altitude. A suitable means for producing the altitude signal h is commonly available in commercial aircraft and, as such, will not be discussed here.

The altitude signal h is passed to a pair of summers 12, 14. Also passed to an input of summer 12 is the output from block 16. Block 16 produces a fixed signal corresponding to the altitude height for flare initiation $h_o$. As discussed above, in a system according to the instant invention the flare initiation altitude $h_o$ is constant regardless of groundspeed variations. The summer 12 acts to subtract the signal $h_o$ from the signal h such that its output is negative if and only if the aircraft altitude has dropped below the flare initiation altitude. Upon this occurrence, a logic circuit 18 activates a switch 20 which causes the pitch flare command signal $\delta_{ec}$, which is produced in a manner discussed herein below, to be coupled to the aircraft's flight dynamics.

The pitch control command signal $\delta_{ec}$ is computed as follows. The altitude signal h is summed with a constant signal $h_B$ supplied from block 30. Thus, the output from summer 14 is of the form $h + h_B$. This signal is applied as one input to a multiplier 32.

The groundspeed block 40 produces an output signal $V_G$ corresponding to aircraft groundspeed. Such groundspeed signals $V_G$ are commonly provided on commercial aircraft and, as such, will not be discussed here.

The groundspeed signal $V_G$ is multiplied by a factor $1/V_{G\ REF}$ in block 42. The signal $1/V_{G\ REF}$ is a constant value depending upon a particular system configuration. The signal out of block 42 is then multiplied by a gain factor $K_h/K'_h$ in block 44. Both $K_h$ and $K'_h$ are constants selected for a particular system configuration.

Thus, the output from block 44 is a signal having a value $$(V_G/V_{G\ REF})\cdot(K_h/K'_h) = 1/\tau \quad (10)$$

This signal is then applied to the remaining input of multiplier 32 where it is multiplied by the signal $h + h_B$.

The output from multiplier 32 is summed in a summer 46 with the output from altitude rate block 48. Altitude rate block 48 produces an altitude rate signal $\dot{h}$ which, as with the altitude block 10 and groundspeed block 40, is commonly provided in commercial aircraft.

The output from summer 46 is multiplied by a gain factor $K'_h$ in gain block 50. The factor $K'_h$ is a constant dependent upon a given system configuration.

Thus, the signal at the output from gain block 50 is $$K'_h\{\dot{h} + V_G[(K_h/K'_h)/V_{G\ REF}](h + h_B)\}. \quad (9)$$

This signal is, then, the desired improved control law signal.

In all aircraft flight guidance control systems, there are certain control law damping signals which are used to dampen short and long term oscillations. These are well understood by those skilled in this art and, as such, will not be discussed here. Hence, the control law damping terms are summed with the control signal in a summer circuit 52 before being passed as the output pitch flare command signal $\delta_{ec}$.

It should be understood that the pitch flare command signal may be used in the aircraft either as an input to the flight director to indicate to the pilot a desired aircraft pitch angle or it may be coupled directly to the aircraft's autopilot for automatic control of aircraft flare-out.

In summary, apparatus for, and the method of producing an improved aircraft flare path control signal has been described. This signal is adapted to control aircraft flare-out such that the landing flare distance remains constant despite conditions of varying airspeeds or groundspeeds. In addition, the flare height $h_o$ remains constant despite groundspeed variations.

While a preferred embodiment of the invention has been described in detail, it should be apparent that many modifications and variations thereto are possible, all of which fall within the true spirit and scope of the invention.

We claim:
1. Apparatus for producing an aircraft flare path control signal comprising:

means for producing a signal $h$ representative of aircraft altitude;

means for producing a signal $V_G$ representative of aircraft groundspeed;

means for producing a signal $\dot{h}$ representative of aircraft altitude rate;

computer means for producing a pitch control surface command signal $\delta_{ec}$ according to the relationship:

$$\delta_{ec} = K_{\dot{h}}\{\dot{h} + V_G[(K_h/K_{\dot{h}})/V_{G\ REF}](h + h_B)\}$$

where $K_{\dot{h}}$, $K_h$, $V_{G\ REF}$ and $h_B$ are constants selected for a given system configuration; and control means for actuating the aircraft control surfaces to track said command signal $\delta_{ec}$ whereby aircraft landing flare distance is substantially unaffected by the aircraft's relative groundspeed.

2. A method for producing an aircraft flare path control signal comprising the steps of:
(a) producing a signal $h$ representative of aircraft altitude;
(b) producing a signal $V_G$ representative of aircraft groundspeed;
(c) producing a signal $\dot{h}$ representative of aircraft altitude rate;
(d) computing a pitch control surface command signal $\delta_{ec}$ according to the relationship:

$$\delta_{ec} = K_{\dot{h}}\{\dot{h} + V_G[(K_h/K_{\dot{h}})/V_{G\ REF}](h + h_B)\}$$

where $K_{\dot{h}}$, $K_h$, $V_{G\ REF}$ and $h_B$ are constants selected for a given system configuration; and
(e) actuating the aircraft control surfaces to track said command signal $\delta_{ec}$ whereby aircraft landing flare distance is substantially unaffected by the aircraft's relative groundspeed.

* * * * *